United States Patent
Kim et al.

(10) Patent No.: US 10,361,428 B2
(45) Date of Patent: Jul. 23, 2019

(54) ANODE ACTIVE MATERIAL, METHOD OF PREPARING THE SAME, AND LITHIUM SECONDARY BATTERY INCLUDING THE ANODE ACTIVE MATERIAL

(71) Applicant: SAMSUNG SDI CO., LTD., Yongin-si, Gyeonggi-do (KR)

(72) Inventors: Young-Ugk Kim, Yongin-si (KR); Seung-Uk Kwon, Yongin-si (KR); Jae-Hyuk Kim, Yongin-si (KR); Chang-Ui Jeong, Yongin-si (KR); Soon-Sung Suh, Yongin-si (KR); Hee-Young Chu, Yongin-si (KR); Duk-Hyoung Yoon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 177 days.

(21) Appl. No.: 14/624,536

(22) Filed: Feb. 17, 2015

(65) Prior Publication Data

US 2015/0295235 A1    Oct. 15, 2015

(30) Foreign Application Priority Data

Apr. 10, 2014    (KR) .................... 10-2014-0043183

(51) Int. Cl.
*H01M 4/134* (2010.01)
*H01M 4/38* (2006.01)
*H01M 10/052* (2010.01)
*C01B 33/021* (2006.01)
*H01M 4/02* (2006.01)

(52) U.S. Cl.
CPC .......... *H01M 4/386* (2013.01); *C01B 33/021* (2013.01); *H01M 10/052* (2013.01); *C01P 2004/60* (2013.01); *C01P 2006/16* (2013.01); *C01P 2006/17* (2013.01); *H01M 2004/021* (2013.01)

(58) Field of Classification Search
CPC .............. H01M 4/386; H01M 10/052; H01M 2004/021; C01B 33/021; C01P 2004/60; C01P 2006/16; C01P 2006/17
See application file for complete search history.

(56) References Cited

U.S. PATENT DOCUMENTS

2012/0231326 A1    9/2012    Biswal et al.
2013/0196233 A1    8/2013    Moon et al.

FOREIGN PATENT DOCUMENTS

KR    10-2004-0082876 A    9/2004
KR    10-2012-0010211 A    2/2012
KR    10-2013-0089569 A    8/2013
KR    10-2014-0107092 A    9/2014

OTHER PUBLICATIONS

Machine translation of 10-2012-0010211, retrieved from <http://kposd.kipo.go.kr:8088/up/kpion/> on Aug. 9, 2016.*
Kim, Hyunjung et al., "Three-Dimensional Porous Silicon Particles for Use in High-Performance Lithium Secondary Batteries", Angewandte Chemie, 2008, pp. 10151-10154, vol. 47.

* cited by examiner

*Primary Examiner* — Cynthia K Walls
(74) *Attorney, Agent, or Firm* — Lewis Roca Rothgerber Christie LLP

(57) ABSTRACT

An anode active material including a porous silicon having pores with a uniform average pore diameter, wherein the average pore diameter of the pores is in a range of about 50 nm to about 80 nm, a method of preparing the anode active material, and a lithium secondary battery including an anode including the anode active material.

15 Claims, 5 Drawing Sheets

ANODE ACTIVE MATERIAL, METHOD OF PREPARING THE SAME, AND LITHIUM SECONDARY BATTERY INCLUDING THE ANODE ACTIVE MATERIAL

CROSS-REFERENCE TO RELATED APPLICATION

This application claims priority to and the benefit of Korean Patent Application No. 10-2014-0043183, filed on Apr. 10, 2014, in the Korean Intellectual Property Office, the disclosure of which is incorporated herein in its entirety by reference.

BACKGROUND

1. Field

One or more embodiments of the present invention relate to an anode active material, a method of preparing the anode active material, and a lithium secondary battery including the anode active material.

2. Description of the Related Art

Lithium secondary batteries are used in portable electronic devices for mobile communication, such as mobile phones, notebook computers, electric bicycles, or electric vehicles, and may have a relatively higher energy density than conventional batteries.

Lithium secondary batteries produce electrical energy by oxidation and reduction reactions that occur when lithium ions are intercalated to or deintercalated from a cathode and an anode, said cathode and anode each including an active material that enables the intercalation and deintercalation of lithium ions, and having an organic electrolyte or a polymer electrolyte filled therebetween.

An anode active material, for example, an oxide that includes lithium and a transition metal and has a structure enabling intercalation of lithium ions may be used in a lithium secondary battery. Examples of an oxide that may be used as a positive active material include, but are not limited to, lithium cobalt oxide ($LiCoO_2$), lithium nickel oxide ($LiNiO_2$), and lithium nickel cobalt manganese oxide (Li[NiCoMn]$O_2$, Li[Ni$_{1-x-y}$Co$_x$M$_y$]$O_2$).

A typical anode active material that is used (utilized) in a lithium secondary battery may be selected from carbonaceous materials, such as artificial graphite, natural graphite or hard carbon, and non-carbonaceous material, such as Si.

Thus, non-carbonaceous materials have been recently investigated as a negative active material for lithium secondary batteries. However, their volumetric swelling or shrinkage during charging and discharging of a lithium battery may lead to a decrease in capacity retention ratios, charging/discharging efficiency, and lifespan characteristics. Accordingly, there are limitations to using (utilizing) known carbonaceous and non-carbonaceous materials as high-performance negative active materials for lithium batteries.

As demand for lithium secondary batteries with a high capacity has increased, developments have been made to increase a capacity of an anode active material. In this regard, there is a need to develop high capacity metal materials, such as silicon and tin, and alloy materials thereof.

SUMMARY

Aspects of one or more embodiments of the present invention are directed toward an anode active material, a method of preparing the anode active material, and a lithium secondary battery including the anode active material.

Additional aspects will be set forth in part in the description which follows and, in part, will be apparent from the description, or may be learned by practice of the presented embodiments.

According to one or more embodiments of the present invention, an anode active material includes a porous silicon having pores with a uniform average pore diameter, wherein the average pore diameter of the pores is in a range of about 50 nm to about 80 nm.

According to one or more embodiments of the present invention, a lithium secondary battery includes a cathode; an anode containing the anode active material; and an electrolyte disposed between the cathode and the anode.

According to one or more embodiments of the present invention, a method of preparing an anode active material includes heat-treating a silicon aluminum alloy in an inert gas atmosphere at a temperature in a range of about 300° C. to about 450° C.; and selectively removing the aluminum by performing etching on a resultant of the heat-treating with an acidic solution.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
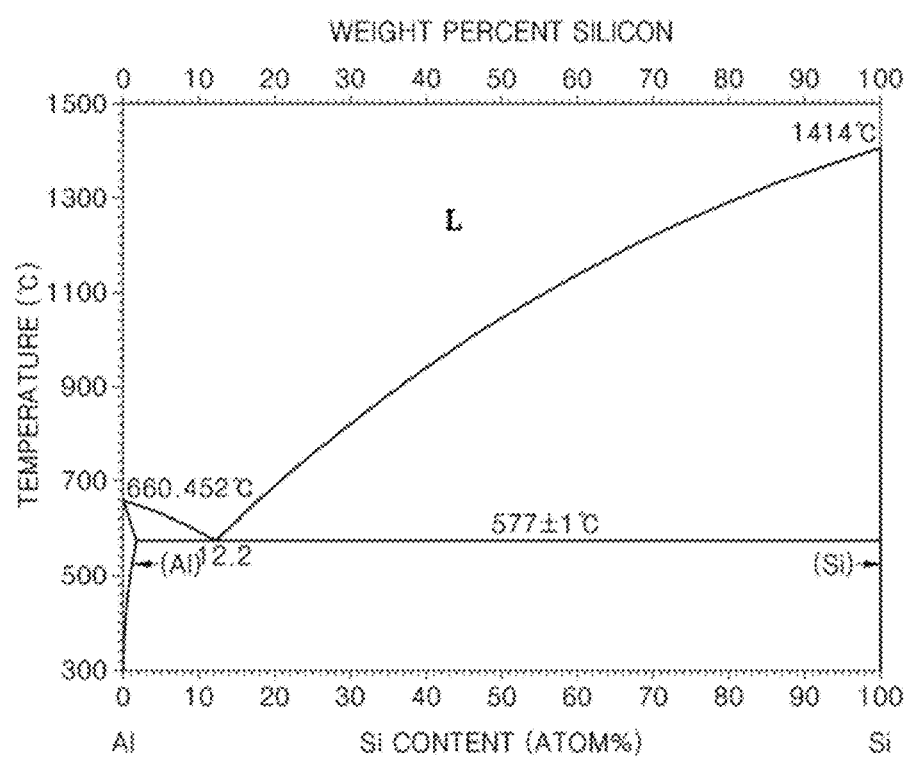
FIG. 1 is a silicon-aluminum binary phase diagram.

Reference will now be made in more detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, an anode active material according to an embodiment of the present invention, a method of preparing the anode active material, and a lithium secondary battery including an anode including the anode active material are provided.

The anode active material includes a porous silicon, in which pores with a uniform average pore diameter are distributed, and an average pore diameter of the pores is in a range of about 50 nm to about 80 nm.

An average pore diameter of the pores is, for example, about 60 nm.

The pores of the porous silicon may be connected to (coupled to or in fluid communication with) one another.

A coating layer may be further formed on a surface of the porous silicon.

For an anode active material, silicon and aluminum are used to prepare a silicon aluminum alloy powder. From the silicon aluminum alloy powder, crystalline growth may occur as each phase of the powder is separated through an aging process. Then, if aluminum is selectively removed through an etching process, a desired porous silicon may be obtained. Here, a mixing ratio of the silicon and aluminum may be controlled, and thus a porosity of the porous silicon may be controlled, and a pore size of the porous silicon may be controlled according to a temperature and time for heat-treating.

Hereinafter, a method of preparing the anode active material according to an embodiment of the present invention will be described in more detail.

A silicon aluminum powder is prepared.

Aluminum is a metal for forming pores and is easily removed during etching compared to silicon, and thus a porous silicon may be obtained. As shown in FIG. 1, aluminum can form an eutectic with silicon, and thus aluminum and silicon can be homogeneously mixed in a transition area. Aluminum and silicon are mixed according to a composition in the powder, and the mixture is dissolved to obtain a silicon aluminum alloy in a solid state by using (utilizing) a rapid cooling device, such as a melt spinner.

In the silicon aluminum alloy, a content of the aluminum may be in a range of about 40 wt % to about 70 wt %, for example, about 50 wt % to about 60 wt %. When the content of the aluminum is within these ranges, a pore size of the porous silicon may be easily controlled as desired, and thus an anode active material may have a large capacity and may suppress a destructive phenomenon caused by stress generated by silicon volume change in repeated charging and discharging conditions. When a lithium secondary battery includes the anode active material, life characteristics and charging/discharging characteristics of the lithium secondary battery may be excellent.

A heat-treatment may be then performed in an inert gas atmosphere to control a size of an area for aluminum and silicon. In one embodiment, the heat-treatment is performed at a temperature in a range of about 300° C. to about 450° C. A period of time for the heat-treatment may vary depending on the heat-treatment temperature, but the heat-treatment may be performed, for example, from about 0.5 hour to about 3 hours.

When the heat-treatment is performed at a temperature lower than 300° C., a size of the area for aluminum and silicon is not controlled, and when the heat-treatment is performed at a temperature higher than 500° C., the silicon melts, and thus particles of the silicon are coagulated or a porous silicon finally obtained may be amorphous.

The inert gas atmosphere may include an inert gas, for example, nitrogen, argon, or helium.

Aluminum is selectively removed from the silicon aluminum alloy by performing etching by using an acidic solution.

The acidic solution may be an aqueous hydrochloric acid solution. A concentration of the aqueous hydrochloric acid solution may be in a range of about 5 wt % to about 35 wt %, or, in particular, about 30 wt % (here, wt % or weight/weight % or mass percentage=mass of solute (hydrochloric acid)/mass of solution×100).

Also, the resultant, which is prepared by the selective removal of aluminum, is washed by distilled water and alcohol. Here, the alcohol may be methanol, ethanol, or butanol.

A porous silicon may be obtained after the washing process.

The porous silicon may have an average particle diameter in a range of about 10 nm to about 100 μm, for example, about 10 nm to about 50 μm. When the porous silicon has an average particle diameter within these ranges and is used (utilized) as an anode active material, cycle characteristics and life characteristics of a lithium secondary battery during reaction with lithium may be excellent.

An average pore diameter of the porous silicon may be in a range of about 50 nm to about 80 nm and may be uniform. D50 of the porous silicon is in a range of about 45 nm to about 65 nm, for example, about 59 nm; D90 may be in a range of about 45 nm to about 55 nm, for example, about 50 nm; and D10 may be in a range of about 60 nm to about 70 nm, for example, about 65 nm. Here, the term D50, D10, and D90 each respectively denote average pore diameters of the pores in the porous silicon showing 50 vol %, 10 vol %, and 90 vol % in a cumulative distribution curve.

A porosity of the porous silicon may be in a range of about 45% to about 60%. When the porosity is within this range, characteristics of the porous silicon, such as a capacity, may be excellent.

The porous silicon has a crystalline structure.

The silicon aluminum alloy powder used in the embodiment may be obtained by using a rapid cooling device, to maintain a homogenous mixture state at room temperature as long as possible after mixing and dissolving the silicon and aluminum.

The alloy process may include a vacuum induction melting (VIM) method, an arc melting method, or a mechanical alloying method. For example, the process may include a VIM method which dissolves the silicon aluminum alloy in a vacuum condition to suppress oxidation caused by the air as much as possible. However, the method of preparing a silicon aluminum alloy is not limited thereto, and any suitable method of preparing an alloy available in the art may be used.

Then, the silicon aluminum alloy is cooled to form a silicon aluminum alloy phase.

The cooling process may include a melt spinner method or a gas atomization method. For example, a melt spinner method may be used to maintain a homogenous mixture state at room temperature as long as possible, which enables mass production as the method is relatively inexpensive.

However, the method is not limited to the rapid cooling methods listed above, and any suitable rapid cooling method capable of rapidly cooling an alloy at a rate of about $10^3$ K/sec or higher may be used. For example, the method may include a single roll melt spinner method in which the melted alloy is sprayed on one rotating roll, a twin roll melt spinner method in which the melted alloy is sprayed onto two rotating rolls, a gas-water atomization method in which water is sprayed onto the melted alloy, or a centrifugal atomization method in which the alloy is prepared as an electrode. The method may generate a spark discharge, and may generate a centrifuge strength by melting, evaporating, and rapidly cooling a rotation electrode material by using the spark discharge.

The silicon aluminum alloy phase is pulverized to obtain a silicon aluminum powder. During the pulverization, a mechanical milling method using, for example, a ball mill may be used.

An average particle diameter of the silicon aluminum powder may be in a range of about 0.1 μm to about 10 μm, for example, about 0.3 μm to about 10 μm, or, for example, about 8.1 μm.

The anode active material according to an embodiment of the present invention may control a porosity and a pore size to effectively suppress volume expansion which occurs during charging of the silicon anode active material and may control an energy density during formation of the electrode.

According to another embodiment of the present invention, an anode for a lithium secondary battery including the anode active material is provided.

Hereinafter, a process of preparing a lithium secondary battery including the anode active material will be described. Also, a method of manufacturing a lithium secondary battery including an anode, a cathode, a lithium salt-containing non-aqueous electrolyte, and a separator, according to an embodiment of the present invention will be described.

The cathode and the anode are each respectively prepared by applying a coating of a composition for forming a cathode active material layer and a composition for forming an anode active material layer on a current collector and drying the same.

The composition for forming an anode active material is prepared by mixing an anode active material, a conducting agent, a binder, and a solvent.

The binder is a component that enhances binding strength between an active material and a conducting agent and binding strength to a current collector, where an amount of the anode active material is in a range of about 1 parts by weight to about 50 parts by weight based on 100 parts by weight of the total weight of the anode active material. Examples of the binder include polyvinylidene fluoride, polyvinyl alcohol, carboxymethyl cellulose (CMC), starch, hydroxypropyl cellulose, reproduced cellulose, polyvinylpyrrolidone, tetrafluoroethylene, polyethylene, polypropylene, ethylene-propylene-diene terpolymers (EPDM), sulfonated EPDM, styrene butylene rubber, fluorine rubber, and polyamide-imide (PAI). An amount of the binder is in a range of about 2 parts by weight to about 5 parts by weight based on 100 parts by weight of the total weight of the anode active material layer. When an amount of the binder is within this range above, a binding strength appropriate for binding the active material layer to the current collector is obtained.

The conducting agent may be any suitable material that has conductivity while not generating a chemical change in the battery. Examples of the conducting agent include graphite, such as natural graphite or artificial graphite; a carbon-based material, such as carbon black, acetylene black, ketjen black, channel black, furnace black, lamp black, or summer black; conductive fibers, such as carbon fibers or metal fibers; a metal powder of a fluorinated carbon, aluminum, or nickel; conductive whiskers, such as zinc oxide or potassium titanate; a conductive metal oxide, such as titanium oxide; and a conductive material, such as a polyphenylene derivative.

An amount of the conducting agent may be in a range of about 2 parts to about 5 parts by weight based on 100 parts by weight of the total weight of the anode active material. When an amount of the conducting agent is within the above range, conductivity characteristics finally obtained may be excellent.

Example of the solvent may be N-methylpyrrolidone.

An amount of the solvent may be in a range of about 1 part to about 10 parts by weight based on 100 parts by weight of the total weight of the anode active material. When an amount of the solvent is within this range, a process of the active material layer is facilitated.

The anode current collector may be generally prepared at a thickness of about 3 μm to about 500 μm. A material for the anode current collector is not particularly limited as long as the material has conductivity while not generating a chemical change in the battery, and examples of the material include copper, stainless steel, aluminum, nickel, titanium, heat-treated carbon, copper or stainless surface-treated with carbon, nickel, titanium, or silver, and an aluminum-cadmium alloy. Also, as well as a cathode current collector, fine bumps may be formed on a surface of the anode current collector to enhance a bonding strength of the anode active material, and the anode current collector may be used in various suitable forms, such as a film, a sheet, a foil, a net, a porous body, a foam body, or a non-woven fabric.

Separate from the anode current collector, a cathode active material, a binder, a conducting agent, and a solvent are mixed to prepare a composition for forming an anode active material layer.

The cathode active material may be a material capable of intercalating and deintercalating lithium ions. The active material may be a compound capable of reversible intercalation and deintercalation of lithium (a lithiated intercalation compound). In particular, the active material may be a compound represented by one of formulae below.

For example, the cathode active material may be a compound represented by one selected from $Li_aA_{1-b}R_bD_2$ (where, $0.90 \leq a \leq 1.8$ and $0 \leq b \leq 0.5$); $Li_aE_{1-b}R_bO_{2-c}D_c$ (where, $0.90 \leq a \leq 1.8$, $0 \leq b \leq 0.5$, and $0 \leq c \leq 0.05$); $LiE_{2-b}R_bO_{4-c}D_c$ (where, $0 \leq b \leq 0.5$ and $0 \leq c \leq 0.05$); $Li_aNi_{1-b-c}Co_bR_cD_\alpha$ (where, $0.90 \leq a \leq 1.8$, $0 \leq b \leq 0.5$, $0 \leq c \leq 0.05$, and $0 < \alpha \leq 2$); $Li_aNi_{1-b-c}Co_bR_cO_{2-\alpha}Z_\alpha$ (where, $0.90 \leq a \leq 1.8$, $0 \leq b \leq 0.5$, $0 \leq c \leq 0.05$, and $0 < \alpha < 2$); $Li_aNi_{1-b-c}Co_bR_cO_{2-\alpha}Z_2$ (where, $0.90 \leq a \leq 1.8$, $0 \leq b \leq 0.5$, $0 \leq c \leq 0.05$, and $0 < \alpha < 2$); $Li_aNi_{1-b-c}Mn_bR_cD_\alpha$ (where, $0.90 \leq a \leq 1.8$, $0 \leq b \leq 0.5$, $0 \leq c \leq 0.05$, and $0 < \alpha \leq 2$); $Li_aNi_{1-b-c}Mn_bR_cO_{2-\alpha}Z_\alpha$ (where, $0.90 \leq a \leq 1.8$, $0 \leq b \leq 0.5$, $0 \leq c \leq 0.05$, and $0 < \alpha < 2$); $Li_aNi_{1-b-c}Mn_bR_cO_{2-\alpha}Z_2$ (where, $0.90 \leq a \leq 1.8$, $0 \leq b \leq 0.5$, $0 \leq c \leq 0.05$, and $0 < \alpha < 2$); $Li_aN-i_bE_cG_dO_2$ (where, $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (where, $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where, $0.90 \leq a \leq 1.8$ and $0.001 \leq b \leq 0.1$); $Li_aCoG_bO_2$ (where, $0.90 \leq a \leq 1.8$ and $0.001 \leq b \leq 0.1$); $Li_aMnG_bO_2$ (where, $0.90 \leq a \leq 1.8$ and $0.001 \leq b \leq 0.1$); $Li_aMn_2G_bO_4$ (where, $0.90 \leq a \leq 1.8$ and $0.001 \leq b \leq 0.1$); $QO_2$; $QS_2$; $LiQS_2$; $V_2O_5$; $LiV_2O_5$; $LiTO_2$; $LiNiVO_4$; $Li_{(3-f)}J_2(PO_4)_3$ (where, $0 \leq f \leq 2$); $Li_{(3-f)}Fe_2(PO_4)_3$ (where, $0 \leq f \leq 2$); and $LiFePO_4$.

In the formulae, A is selected from the group consisting of Ni, Co, Mn, and a combination thereof; X is selected from the group consisting of Al, Ni, Co, Mn, Cr, Fe, Mg, Sr, V, a rare earth element, and a combination thereof; D is selected from the group consisting of O, F, S, P, and a combination thereof; E is selected from the group consisting of Co, Mn, and a combination thereof; M is selected from the group consisting of F, S, P, and a combination thereof; G is selected from the group consisting of Al, Cr, Mn, Fe, Mg, La, Ce, Sr, V, and a combination thereof; Q is selected from the group consisting of Ti, Mo, Mn, and a combination thereof; Z is selected from the group consisting of Cr, V, Fe, Sc, Y, and a combination thereof; and J is selected from the group consisting of V, Cr, Mn, Co, Ni, Cu, and a combination thereof, but the formulae are not limited thereto. For example, the cathode active material may be a lithium titanate.

The lithium titanate may be a spinel-type (kind) lithium titanate, an anatase-type lithium titanate, or a ramsdellite-type lithium titanate according to a crystalline structure.

In particular, the cathode active material may be represented by $Li_{4-x}Ti_5O_{12}(0 \leq x \leq 3)$. For example, the cathode active material may be, but not limited to, $Li_4Ti_5O_{12}$.

In some embodiments, examples of the cathode active material may be, but not limited to, $Li_aNi_bCo_cMn_dG_eO_2$ (where, $0.90 \leq a \leq 1.1$, $0 \leq b \leq 0.9$, $0 \leq c \leq 0.5$, $0 \leq d \leq 0.5$, and $e=0$, for example, $a=1$, $b=0.5$, $c=0.2$, $d=0.3$, and $e=0$) and $LiMn_2O_4$.

The respective types of the binder and the conducting agent for the cathode and the amounts of the binder and the conducting agent may be the same as those of the anode.

The cathode current collector has a thickness of about 3 μm to about 500 μm, and thus a material for the cathode current collector is not particularly limited as long as the material has high conductivity while not generating a chemical change in the battery, and examples of the material include stainless steel, aluminum, nickel, titanium, heat-treated carbon, and aluminum or stainless that is surface-treated with carbon, nickel, titanium, or silver. Also, fine bumps may be formed on a surface of the cathode current collector to enhance a bonding strength of the cathode active material, and the cathode current collector may be used in various suitable forms, such as a film, a sheet, a foil, a net, a porous body, a foam body, or a non-woven fabric.

According to the process, a separator is disposed between the prepared cathode and anode.

A pore diameter of the separator is in a range of about 0.01 μm to about 10 μm and a thickness of the separator is in a range of about 5 μm to about 300 μm. In particular, the separator may be formed of, for example, an olefin-based polymer such as polypropylene or polyethylene; or a sheet or non-woven fabric formed of glass fibers. As an electrolyte, when a solid electrolyte, such as a polymer, is used, the solid electrolyte may also serve as a separator.

A lithium salt-containing non-aqueous electrolyte is formed of a non-aqueous electrolyte solution and lithium. The non-aqueous electrolyte may be a non-aqueous electrolyte solution, an organic solid electrolyte, or an inorganic solid electrolyte.

Examples of the non-aqueous electrolyte solution may be an aprotic organic solvent, such as N-methyl-2-pyrollidinone, propylene carbonate, ethylene carbonate, butylenes carbonate, dimethyl carbonate, diethyl carbonate, gamma-butyro lactone, 1,2-dimethoxy ethane, 2-methyl tetrahydrofuran, N,N-dimethylsulfoxide, 1,3-dioxolane, N,N-formamide, N,N-dimethylformamide, acetonitrile, nitromethane, methyl formate, methyl acetate, triester phosphate, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate.

Examples of the organic solid electrolyte may include a polyethylene derivative, a polyethylene oxide derivative, a polypropylene oxide derivative, a phosphate ester polymer, a polyester sulfide, a polyvinyl alcohol, and a polyvinylidene fluoride.

Examples of the inorganic solid electrolyte may include a lithium nitride, such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, or $Li_3PO_4$—$Li_2S$—$SiS_2$; a halide; and a sulfate.

The lithium salt easily dissolves in the non-aqueous electrolyte, and examples of the lithium salt may include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloro-borate, and a lower aliphatic lithium carboxylic acid.

Figure 2:
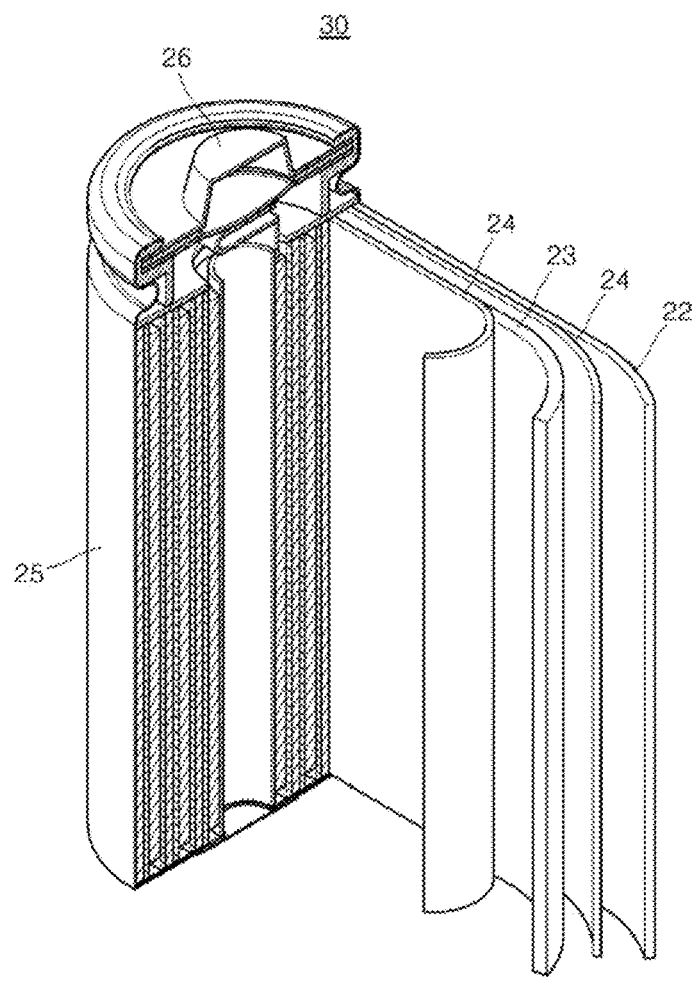
FIG. 2 is a schematic view of a lithium secondary battery according to an embodiment of the present invention.

FIG. 2 is a cross-sectional view of a representative structure of a lithium secondary battery 30 according to an embodiment of the present invention.

Referring to FIG. 2, the lithium secondary battery 30 includes a cathode 23; an anode 22; a separator 24 disposed between the cathode 23 and the anode 22; an electrolyte impregnated between the cathode 23, the anode 22, and the separator 24; a battery case 25; and a cap assembly 26 that seals the battery case 25. The lithium secondary battery 30 may be prepared by sequentially stacking the cathode 23, the anode 22, and the separator 24 and rolling the same into a spiral shape (jelly-roll shape) to be accommodated in the battery case 25. The battery case 25 is sealed with the cap assembly 26, thereby completing the lithium secondary battery 30.

Hereinafter, the present invention will be described in further detail with reference to the following examples, but these examples are not intended to limit the scope of the present invention.

EXAMPLE 1

Si and Al were mixed at a ratio of 40:60 wt %. The mixture was melted under a vacuum condition by using an induction melting furnace to prepare a Si—Al alloy, as a mother alloy. The prepared mother alloy was pulverized into an appropriate size, charged into a graphite furnace that is installed in a melt spinner, and then mixed while melting at a temperature of 1400° C. to 1500° C. for 5 minutes. The mixed melt was cooled to room temperature at a cooling rate of $10^7$ K/sec to prepare a silicon aluminum alloy ribbon in a ribbon shape. The silicon aluminum alloy ribbon was pulverized to prepare an alloy powder having an average particle diameter of about 8.1 μm.

20 g of the alloy powder was heat-treated at a temperature of about 400° C. for 1 hour.

Then, the resultant of the heat-treated alloy powder was treated with about 35 wt % of aqueous HCl solution, washed with distilled water and alcohol, and then dried at a temperature of about 80° C. to prepare an anode active material. The HCl solution was obtained by diluting water and about 35 wt % of hydrochloric acid at a volume ratio of about 3:1.

EXAMPLE 2

Preparation of Anode Active Material

An anode active material was prepared in the same manner used in Example 1, except that 20 g of the alloy powder was heat-treated at a temperature of about 300° C.

COMPARATIVE EXAMPLE 1

Preparation of Anode Active Material

An anode active material was prepared in the same manner used in Example 1, except that the alloy powder was not heat-treated.

COMPARATIVE EXAMPLE 2

Preparation of Anode Active Material

An anode active material was prepared in the same manner used in Example 1, except that 20 g of the alloy powder was heat-treated at a temperature of about 500° C.

MANUFACTURING EXAMPLE 1

Manufacture of Coin Cell

A 2032-type coin cell was prepared by using the anode active material prepared in Example 1 as follows.

The anode active material prepared in Example 1, graphite (MC20), styrenebutadiene rubber, and carboxymethyl cellulose were mixed at a weight ratio of 14.55:82.45:1.5:1.5 in N-methylpyrrolidone to prepare an anode active material slurry. A copper current collector having a thickness of about 10 μm was coated with the anode active material slurry and dried at a temperature of 350° C. for 1 hour under a vacuum condition to prepare an anode active material layer. Then, the anode active material layer with a thickness of 42 μm was stacked on the copper current collector, and then a circular hole with a diameter of 16 mm was punched therethrough to prepare an anode.

The anode and a lithium metal counter electrode were used to prepare a 2032-type coin cell. A separator (with a thickness of about 16 μm) formed of a porous polyethylene film was disposed between the anode and the lithium metal counter electrode, and an electrolyte solution was injected therein, thereby manufacturing a 2032-type coin cell.

Here, the electrolyte solution was prepared by dissolving 1.1 M $LiPF_6$ in a solvent prepared by mixing ethylene carbonate (EC) and ethylmethylcarbonate (EMC) at a volume ratio of 3:5.

MANUFACTURING EXAMPLE 2

Manufacture of Coin Cell

A coin cell was manufactured in the same manner used in Manufacturing Example 1, except that the anode active material prepared in Example 2 was used instead of the anode active material prepared in Example 1.

COMPARATIVE MANUFACTURING EXAMPLES 1 AND 2

Manufacture of Coin Cells

Coin cells were manufactured in the same manner used in Manufacturing Example 1, except that the anode active materials prepared in Comparative Examples 1 and 2 were each respectively used instead of the anode active material prepared in Example 1.

EVALUATION EXAMPLE 1

Analysis Using Scanning Electron Microscope (SEM)

In the preparation of the anode active materials prepared in Examples 1 and 2 and Comparative Example 2, a Si—Al alloy before heat-treatment and a Si alloy after heat-treatment were analyzed by using an SEM, and the results are each respectively shown in FIGS. 3 through 6.

Figure 3:
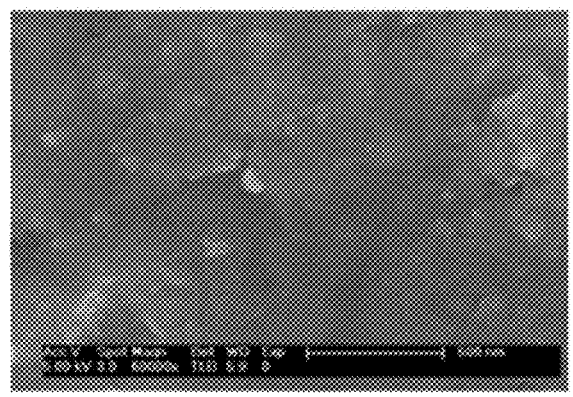
FIG. 3 is a scanning electron microscope (SEM) image of the resultant of an Al alloy before treating the Al alloy with a hydrochloric acid solution in the preparation of the anode active material in Example 1.
Figure 4:
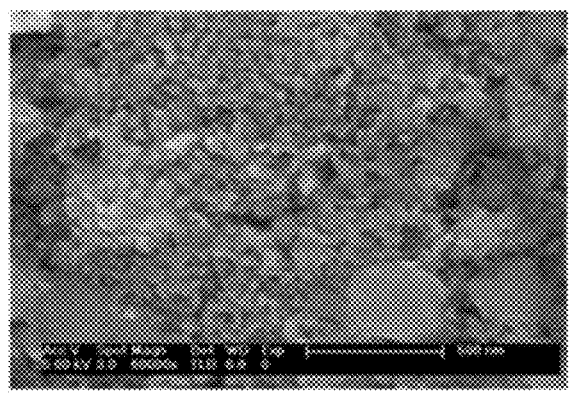
FIG. 4 is an SEM image of an anode active material after treatment with a hydrochloric acid solution in the preparation of the anode active material in Example 1.
Figure 5:
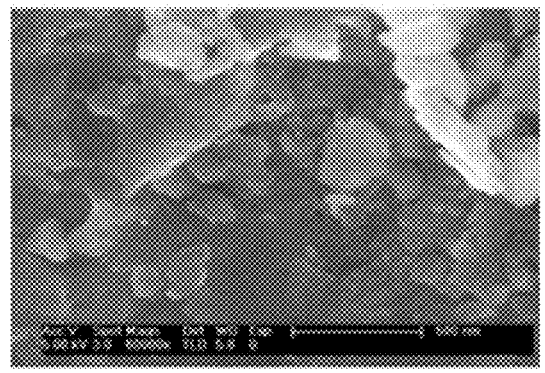
FIG. 5 is an SEM image of an anode active material treated with a hydrochloric acid solution after heat-treatment in the preparation of the anode active material in Example 2.
Figure 6:
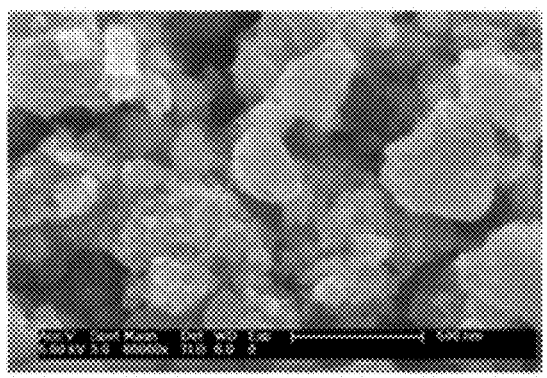
FIG. 6 is an SEM image of an anode active material treated with a hydrochloric acid solution after heat-treatment in the preparation of the anode active material in Comparative Example 2.

FIG. 3 is an SEM image of the resultant of an Al alloy before treating the Al alloy with a hydrochloric acid solution in the preparation of the anode active material in Example 1. FIG. 4 is an SEM image of an anode active material after treatment with a hydrochloric acid solution in the preparation of the anode active material in Example 1. Also, FIG. 5 is an SEM image of an anode active material treated with a hydrochloric acid solution after heat-treatment at a temperature of 300° C. in the preparation of the anode active material in Example 2. FIG. 6 is an SEM image of an anode active material treated with a hydrochloric acid solution after heat-treatment at a temperature of 500° C. in the preparation of the anode active material in Comparative Example 2.

In this regard, it may be confirmed that pore size in the porous silicon after heat-treating the anode active material prepared in Example 1 was determined, the size of pores significantly increased due to sintering aluminum during the heat-treatment, and the pore size was uniform after the heat-treatment compared to that before the heat-treatment.

EVALUATION EXAMPLE 2

Measurement of Pore Size of Porous Silicon and Degree of Distribution

A pore diameter and a pore size distribution of the anode active materials prepared in Example 1 and Comparative Example 2 were measured. Here, the pore diameter and the pore size distribution were measured by infiltrating mercury into the alloy powder by applying a pressure thereon using a mercury porosimeter.

As the result, an average diameter of the pores of the anode active material prepared in Example 1 was in a range of about 50 nm to about 80 nm, and an average diameter of the pores of the anode active material prepared in Comparative Example 2 after aluminum sintering was in a range of about 200 nm to about 1000 nm.

EVALUATION EXAMPLE 3

Battery Life Characteristics Evaluation

Life characteristics of the coin cells prepared in Manufacturing Example 1 and Comparative Manufacturing Examples 1 and 2 were evaluated as follows.

Each of the coin cells prepared in Manufacturing Example 1 and Comparative Manufacturing Examples 1 and 2 went through a cycle of charging at a constant current (1 C) and a constant voltage (1.0 V, 0.01 C cut-off), a rest period for 10 minutes, and discharging at a constant current (1 C, 4.2 V cut-off), where the cycle was repeated 100 times. That is, the life characteristics of each of the coin cells were evaluated based on a change in a discharge capacity according to the charging/discharging cycle, and the results are shown in FIG. 7 and Table 1.

TABLE 1

| | Life retention rate after 100$^{th}$ cycle |
|---|---|
| Manufacturing Example 1 | 92.5% |
| Comparative Manufacturing Example 1 (Si) | 76.7% |
| Comparative Manufacturing Example 2 | 72.3% |

Figure 7:
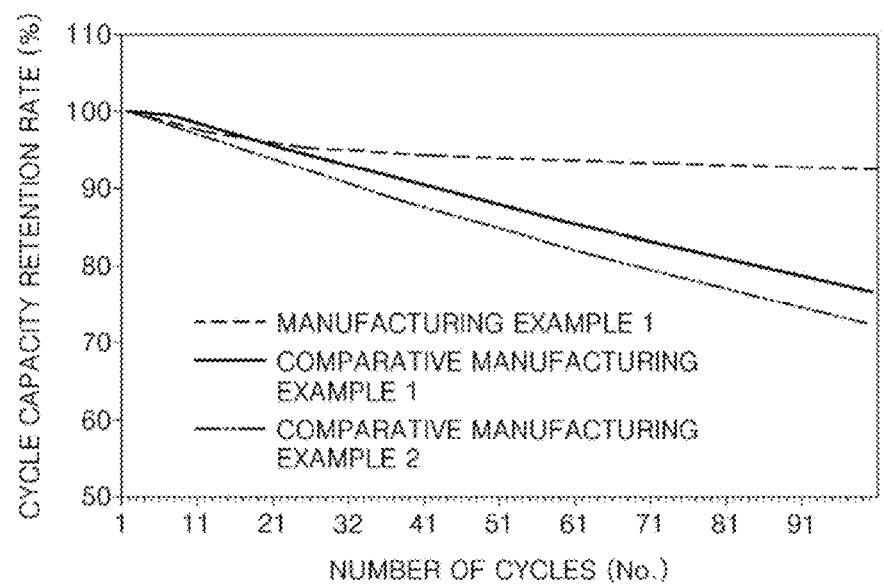
FIG. 7 is a graph illustrating life characteristics of coin cells prepared in Manufacturing Examples 1 and 2 and Comparative Manufacturing Example 1.

Referring to Table 1 and FIG. 7, the coin cell prepared in Manufacturing Example 1 had improved life characteristics compared to those of the coin cells prepared in Comparative Examples 1 and 2.

As described above, according to the one or more of the above embodiments of the present invention, an anode active material is provided to effectively suppress volume expansion which occurs during charging and may increase an energy density in the formation of an electrode. Thus, when the anode active material is included in a lithium secondary battery, an anode for a lithium secondary battery and a lithium secondary battery including the anode may have an improved discharge capacity and improved cycle characteristics.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims and equivalents thereof.

What is claimed is:

1. An anode active material comprising a silicon aluminum alloy comprising aluminum at about 60 wt % to about 80 wt %,
wherein the silicon aluminum alloy is heat-treated without coagulating the silicon, and acid-etched to be a porous silicon having pores with a uniform average pore diameter of about 60 nm to about 80 nm.

2. The anode active material of claim 1, wherein a porosity of the porous silicon is in a range of about 45% to about 60%.

3. The anode active material of claim 1, wherein D50 of silicon of the pores of the porous silicon is in a range of about 45 nm to about 65 nm, D90 is in a range of about 45 nm to about 55 nm, and D10 is in a range of about 60 nm to about 70 nm.

4. The anode active material of claim 1, wherein an average particle diameter of the porous silicon is in a range of about 10 nm to about 100 μm.

5. The anode active material of claim 1, wherein the average pore diameter of the pores of the porous silicon is in a range of about 60 nm to about 70 nm.

6. The anode active material of claim 1, wherein the pores are heat-treated and acid etched pores.

7. A lithium secondary battery comprising:
a cathode;
an anode containing an anode active material comprising a silicon aluminum alloy comprising aluminum at about 60 wt % to about 80 wt %, wherein the silicon aluminum alloy is heat-treated without coagulating the silicon and acid-etched to be a porous silicon having pores with a uniform average pore diameter, wherein the average pore diameter is in a range of about 60 nm to about 80 nm; and
an electrolyte disposed between the cathode and the anode.

8. The lithium secondary battery of claim 7, wherein a porosity of the porous silicon is in a range of about 45% to about 60%.

9. The lithium secondary battery of claim 7, wherein D50 of silicon of the pores of the porous silicon is in a range of about 45 nm to about 65 nm, D90 is in a range of about 45 nm to about 55 nm, and D10 is in a range of about 60 nm to about 70 nm.

10. The lithium secondary battery of claim 7, wherein an average particle diameter of the porous silicon is in a range of about 10 nm to about 100 μm.

11. The lithium secondary battery of claim 7, wherein the average pore diameter of the pores of the porous silicon is in a range of about 60 nm to about 70 nm.

12. A method of preparing the anode active material of claim 1, the method comprising:
heat-treating the silicon aluminum alloy in an inert gas atmosphere and
selectively removing the aluminum by performing etching on a resultant of the heat treated silicon aluminum alloy with an acidic solution.

13. The method of claim 12, wherein a content of aluminum in the silicon aluminum alloy is about 60 wt %.

14. The method of claim 12, wherein the acidic solution is a hydrochloric acid aqueous solution at a concentration of about 5 wt % to about 35 wt %.

15. The method of claim 12, further comprising washing the resultant with distilled water or alcohol.

* * * * *